United States Patent
Kim et al.

(10) Patent No.: US 9,898,799 B2
(45) Date of Patent: Feb. 20, 2018

(54) METHOD FOR IMAGE PROCESSING AND ELECTRONIC DEVICE SUPPORTING THEREOF

(71) Applicant: Samsung Electronics Co., Ltd., Suwon-si, Gyeonggi-do (KR)

(72) Inventors: Sung Oh Kim, Suwon-si (KR); Hyun Hee Park, Seoul (KR); Yong Man Lee, Seongnam-si (KR); Kwang Young Kim, Suwon-si (KR); Ki Huk Lee, Suwon-si (KR); Kwang Tai Kim, Suwon-si (KR); Soo Hyung Kim, Hwaseong-si (KR); Hyun Soo Kim, Daegu (KR); Eun Seok Ryu, Seoul (KR); Jin Hong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 15/052,083

(22) Filed: Feb. 24, 2016

(65) Prior Publication Data
US 2016/0247253 A1  Aug. 25, 2016

(30) Foreign Application Priority Data
Feb. 24, 2015  (KR) .................. 10-2015-0025989

(51) Int. Cl.
G06K 9/54   (2006.01)
G06T 1/60   (2006.01)
G06T 1/20   (2006.01)
G06F 9/00   (2006.01)

(52) U.S. Cl.
CPC .................. *G06T 1/60* (2013.01); *G06F 9/00* (2013.01); *G06T 1/20* (2013.01)

(58) Field of Classification Search
CPC . G06F 9/00; G06F 9/3867; G06T 1/20; G06T 1/60; H04N 21/433
USPC .......................................................... 382/303
See application file for complete search history.

(56) References Cited

U.S. PATENT DOCUMENTS

| | | | |
|---|---|---|---|
| 6,577,760 B1 * | 6/2003 | Ohta | G06T 11/60 382/167 |
| 6,833,865 B1 | 12/2004 | Fuller et al. | |
| 7,403,224 B2 | 7/2008 | Fuller et al. | |
| 2005/0033760 A1 | 2/2005 | Fuller et al. | |
| 2006/0061822 A1 * | 3/2006 | Sung | H04N 9/07 358/1.16 |
| 2006/0139680 A1 * | 6/2006 | Okamoto | H04N 1/32486 358/1.14 |
| 2011/0157426 A1 * | 6/2011 | Lin | H04N 5/262 348/239 |
| 2012/0047340 A1 * | 2/2012 | Inaba | G06F 11/2069 711/162 |

* cited by examiner

*Primary Examiner* — Daniel Mariam
(74) *Attorney, Agent, or Firm* — Jefferson IP Law, LLP

(57) ABSTRACT

An image processing method and an electronic device supporting the method are provided. The electronic device includes a processor having an image processing module processing an input image, and a memory, wherein the processor obtains image data that is processed for the input image, wherein the memory stores volatile information which is temporarily obtained from the image during an image processing process of the image processing module.

18 Claims, 11 Drawing Sheets

METHOD FOR IMAGE PROCESSING AND ELECTRONIC DEVICE SUPPORTING THEREOF

CROSS-REFERENCE TO RELATED APPLICATION(S)

This application claims the benefit under 35 U.S.C. § 119(a) of a Korean patent application filed on Feb. 24, 2015 in the Korean Intellectual Property Office and assigned Serial number 10-2015-0025989, the entire disclosure of which is hereby incorporated by reference.

TECHNICAL FIELD

The present disclosure relates to an image processing method and an electronic device supporting the image processing method.

BACKGROUND

In recent years, mobile electronic devices, such as smart phones, tablet personal computers (PCs), and so on, provide high-performance graphic or image processing functions together with image sensor supporting functions capable of capturing high-quality image or motion pictures. Additionally, image processing applications are increasing in forms of improving image quality, editing images, or recognizing characters or pictures in electronic devices. With requirements of users for more diverse and massive image data, an amount of data calculation is gradually increasing for high-quality image processing in such an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image processing method capable of reducing an amount of data calculation, and an electronic device supporting the image processing method.

It is to be understood that problems addressed by various embodiments of the present disclosure may not be restrictive to those described herein. That is, other problems of the related art may be present and addressed by the various embodiments of the present disclosure.

In accordance with an aspect of the present disclosure, an electronic device is provided. The electronic device includes a processor having an image processing module configured to process an image, and a memory, wherein the processor may obtain image data that is processed for the image and the memory may store volatile information that is temporarily obtained from the image during the image processing.

In accordance with another aspect of the present disclosure, an image processing method is provided. The image processing method includes obtaining image data that is processed from an image processing module processing an input image, and storing volatile information of the image in a header of a storage format of the image data, wherein the volatile information may be temporarily obtained from the image during an image processing process of the image processing module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
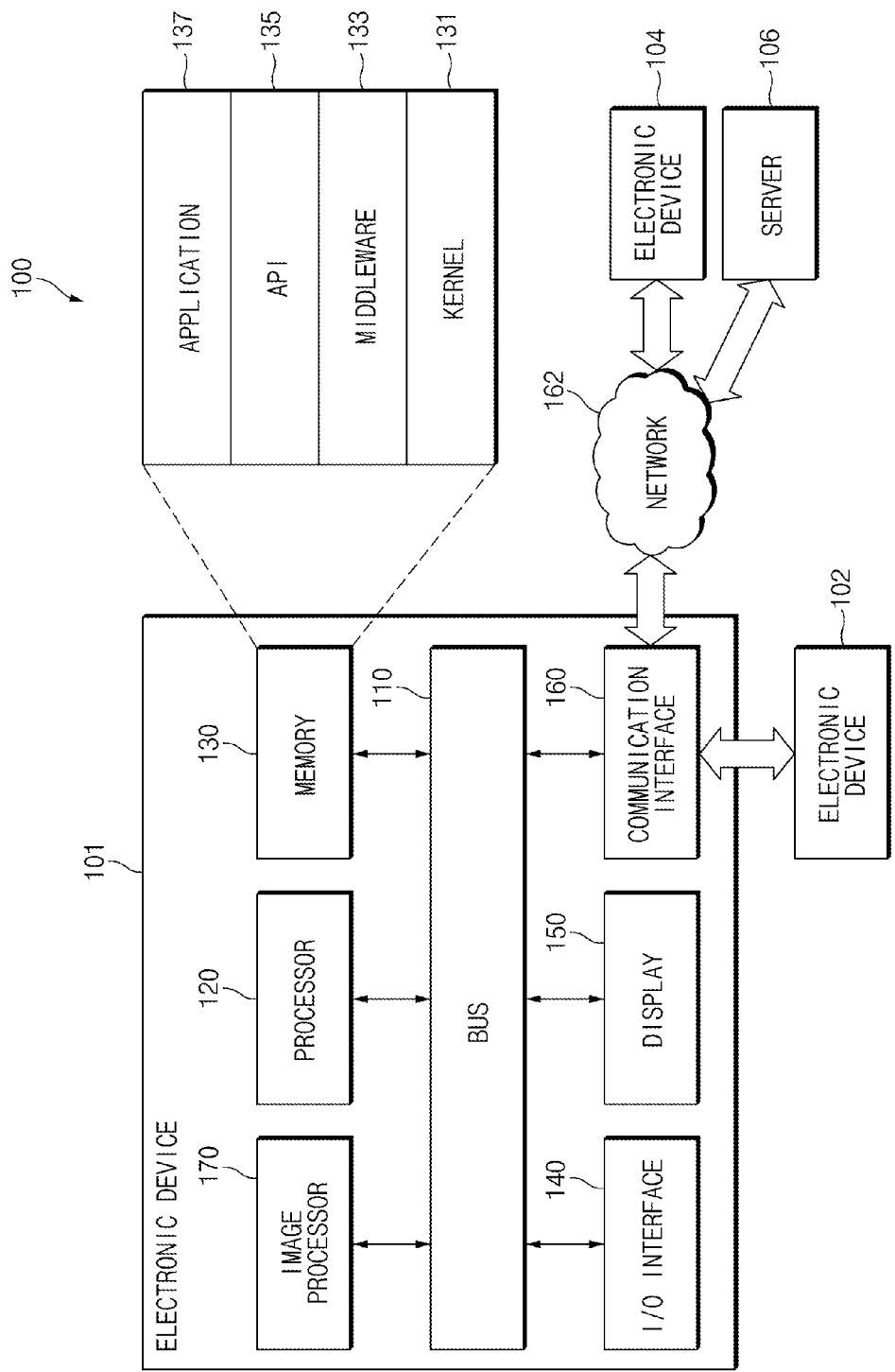
FIG. 1 is a block diagram illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", "may include", "comprise", or "may comprise" used herein indicate existence of corresponding features (e.g., numerical values, functions, operations, or components) but does not exclude other features.

As used herein, the terms "A or B", "at least one of A or/and B", or "one or more of A or/and B" may include all allowable combinations which are enumerated together. For example, the terms "A or B", "at least one of A and B", or "at least one of A or B" may indicate all cases of: (1) including at least one A, (2) including at least one B, or (3) including both at least one A, and at least one B.

As used herein, the terms such as "1st", "2nd", "first", "second", and the like may be used to qualify various elements regardless of their order and/or priority, simply differentiating one from another, but do not limit those elements thereto. For example, both a first user device and a second user device indicate different user devices. For example, a first element may be referred to as a second element and vice versa without departing from the scope of the present disclosure.

As used herein, if one element (e.g., a first element) is referred to as being "operatively or communicatively connected with/to" or "connected with/to" another element (e.g., a second element), it should be understood that the former may be directly coupled with the latter, or connected with the latter via an intervening element (e.g., a third element). Otherwise, it will be understood that if one element is referred to as being "directly coupled with/to" or "directly connected with/to" with another element, it may be understood that there is no intervening element (e.g., a third element) existing between them.

In the description or claims, the term "configured to" (or "set to") may be changeable with other implicative meanings such as "suitable for", "having the capacity to", "designed to", "adapted to", "made to", or "capable of", and may not simply indicate "specifically designed to". Alternatively, in some circumstances, a term "a device configured to" may indicate that the device "may do" something together with other devices or components. For instance, a term "a processor configured to (or set to) perform A, B, and C" may indicate a generic-purpose processor (e.g., central processing unit (CPU) or application processor (AP)) capable of performing its relevant operations by executing one or more software or programs which is stored in an exclusive processor (e.g., embedded processor), which is prepared for the operations, or in a memory.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevantly related art and not in an idealized or overly formal manner unless expressly so defined herein in various embodiments of the present disclosure. In some cases, terms even defined in the specification may not be understood as excluding various embodiments of the present disclosure.

An electronic device according to various embodiments of the present disclosure may include, for example, at least one of a smartphone, a tablet personal computer (tablet PCs), a mobile phone, a video telephone, an electronic book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (e.g., electronic glasses, or head-mounted devices (HMD)), electronic apparel, an electronic bracelet, an electronic necklace, an electronic appcessory, an electronic tattoo, a smart mirror, a smart watch, and the like.

In various embodiments, an electronic device may be a smart home appliance. The smart home appliance, for example, may include at least one of a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, Google TV™, and the like), a game console (e.g., Xbox™, PlayStation™, and the like), an electronic dictionary, an electronic key, a camcorder, an electronic picture frame, and the like.

In other embodiments, an electronic device may include at least one of diverse medical devices (e.g., portable medical measuring instruments (blood-sugar measuring instruments, heart-pulsation measuring instruments, blood-pressure measuring instruments, or body-temperature measuring instruments), magnetic resonance angiography (MRA) equipment, magnetic resonance imaging (MRI) equipment, computed tomography (CT) equipment, scanners, and ultrasonic devices), navigation device, global positioning system (GPS) receiver, event data recorder (EDR), flight data recorders (FDR), vehicle infotainment devices, electronic equipment for vessels (e.g., navigation systems and gyrocompasses), avionics, security devices, head units for vehicles, industrial or home robots, automatic teller's machines (ATM) for financial agencies, points of sales (POS) for stores, and internet of things (e.g., electric bulbs, diverse sensors, electric or gas meter, spring cooler units, fire alarms, thermostats, road lamps, toasters, exercise implements, hot water tanks, boilers, and the like).

According to various embodiments, an electronic device may include at least one of parts of furniture or buildings/structures having communication functions, electronic boards, electronic-signature receiving devices, projectors, and diverse measuring instruments (e.g., water meters, electricity meters, gas meters, and wave meters) including metal cases. In various embodiments, an electronic device may be one or more combinations of the above-mentioned devices. Electronic devices according to various embodiments may be flexible electronic devices. Additionally, electronic devices according to various embodiments of the present disclosure may not be restrictive to the above-mentioned devices, but rather may include new electronic devices emerging by way of technical development.

Hereinafter, an electronic device according to various embodiments will be described in conjunction with the accompanying drawings. In the description of various embodiments, the term "user" may refer to a person using an electronic device or a device (e.g., an artificial intelligent electronic device) using an electronic device.

FIG. 1 is a block diagram illustrating an electronic device according to various embodiments of the present disclosure.

Referring to FIG. 1, an electronic device 101 in a network environment 100 according to various embodiments will be described below. The electronic device 101 may include a bus 110, a processor 120, a memory 130, an input/output (I/O) interface 140, a display 150, a communication interface 160, and an image processor 170. In various embodiments, the electronic device 101 may exclude at least one of the elements therefrom or further include another element therein.

The bus 110, for example, may include a circuit for connecting the elements 110~170 with each other and for relaying communication (control messages and/or data) between the elements.

The processor 120 may include at least one or more of a CPU, an AP, or a communication processor (CP). The processor 120, for example, may execute computation or data operation for control and/or communication of other elements of at least one of the electronic device 101.

Although FIG. 1 illustrates the processor 120 as another module in addition to the image processor 170, various embodiments may allow the image processor 170 to be included in the processor 120.

The memory 130 may include a volatile and/or nonvolatile memory. The memory 130 may store, for example, instructions or data which are involved in at least one of other elements in the electronic device 101. According to an embodiment, the memory 130 may store software and/or program therein. The program may include, for example, a kernel 131, a middleware 133, an application programming interface (API) 135, and/or an application program (or "application") 137. At least a part of the kernel 131, the middleware 133, or the API 135 may be referred to as an operating system (OS).

The memory 130 may store image data, which are processed by stages from an image input to an image pipeline, and volatile information about the corresponding image.

Volatile information may be information about an image temporarily obtained in an image processing process through at least one of a plurality of image processing modules of the image pipeline.

For example, volatile information may include black label, color temperature, average brightness, positional brightness information, positional high-frequency information, color distortion information, edge information, temporal information, and so on.

According to various embodiments, the memory 130 may store volatile information processed through the processor 120 or the image processor 170. This feature will be described in conjunction with FIG. 2.

The kernel 131 may control or manage, for example, system resources (e.g., the bus 110, the processor 120, or the memory 130) which are used for executing operations or functions implemented in other programs (e.g., the middleware 133, the API 135, or the application program 137). Additionally, the kernel 131 may provide an interface capable of controlling or managing system resources by approaching individual elements of the electronic device 101 from the middleware 133, the API 135, or the application program 137.

The middleware 133 may perform a mediating function to allow, for example, the API 135 or the application program 137 to communicate and exchange data with the kernel 131.

Additionally, in relation to one or more work requests received from the application program 137, the middleware 133 may perform, for example, a control operation (e.g., scheduling or load balancing) for the work request by using a method of designating or arranging the priority, which permits the electronic device 101 to use a system resource (e.g., the bus 110, the processor 120, or the memory 130), into at least one application of the application program 137. For example, middleware 133 may perform scheduling or load balancing operations for the one or more work requests by processing the one or more work requests in accordance with the priority.

The API 135 may be, for example, an interface for allowing the application 137 to control a function which is provided from the kernel 131 or the middleware 133. For example, the API 135 may include at least one interface or function (e.g., instructions) for file control, window control, or character control.

The I/O interface 140 may act, for example, as an interface capable of transferring instructions or data, which are input from a user or another external device, to another element (or other elements) of the electronic device 101. Additionally, the I/O interface 140 may output instructions or data, which are received from another element (or other elements) of the electronic device 101, to a user or another external device.

The display 150 may include, for example, a liquid crystal display (LCD), a light emitting diode (LED), an organic LED (OLED) display, a microelectromechanical system (MEMS) display, or an electronic paper. The display 160 may display, for example, diverse contents (e.g., text, image, video, icon, or symbol) to a user. The display 160 may include a touch screen, and, for example, may receive an input of a touch, a gesture, an approach, or a hovering which is made by using an electronic pen or a part of a user's body.

The communication interface 160 may set, for example, a communication condition between the electronic device 101 and an external electronic device (e.g., a first external electronic device 102, a second external electronic device 104, or a server 106). For example, the communication interface 160 may communicate with an external electronic device (e.g., the second external electronic device 104 or the server system 106) in connection with a network 162 through wireless communication or wired communication.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, a short range communication. The short range communication may include, for example, at least one of WiFi, Bluetooth, near field communication (NFC), or GPS. The wired communication may include, for example, at least one of universal serial bus (USB), high definition multimedia interface (HDMI), recommended standard 232 (RS-232), or plain old telephone service (POTS). The network 162 may include a telecommunication network, for example, at least one of a computer network (e.g., local area network (LAN) or wireless LAN (WLAN)), Internet, or a telephone network.

The image processor 170 may include an image pipeline formed of a plurality of image processing modules which process an input image by stages. The image processor 170 may obtain image data which are processed from the input image by stages through the image pipeline.

In the image pipeline, image information may be temporarily obtained during an image processing process of each image processing module. For example, the image pipeline may include an image processing module for scaling an image. The image processing module may scale an input image and transfer the scaled image to the next-stage image processing module of the image pipeline. Edge information of the image may be temporarily obtained while the image processing module is scaling an input image. A general image processing module may transfer a scaled image to the next stage of an image pipeline, and edge information obtained from the image processing is wasted as volatile information. The memory 130 may store volatile information, which is temporarily obtained from the image processing, and the stored volatile information may be utilized for image processing, image post-processing, image coding-decoding (codec), and application in the next stage of the image pipeline.

Volatile information may be obtained respectively from the plurality of image processing modules of the image pipeline. However, various embodiments of the present disclosure may not be restrictive hereto and such volatile information may be even obtained from at least a part of the plurality of image processing modules.

Each of the first and second external electronic devices 102 and 104 may be the same as or different from the electronic device 101. According to an embodiment, the server 106 may include a group of one or more servers. According to various embodiments, all or a part of operations executed in the electronic device 101 may be executed in another one or a plurality of electronic devices (e.g., the electronic device 102 or 104, or the server 106). According to an embodiment, in case there is a need of performing a function or service automatically or by a request for the electronic device 101, the electronic device 101 may request at least a part of the function or service, additionally or instead of executing by itself, from another device (e.g., the electronic device 102 or 104, or the server 106). Such another device (e.g., the electronic device 102 or 104, or the sever 106) may execute such a requested or additional function and transfer a result of the execution of the function. The electronic device 101 may process a received result, as it is or additionally, to provide the requested function or service. To this end, for example, it may be available to adopt cloud computing, distributed computing, or client-server computing technique.

Figure 2:
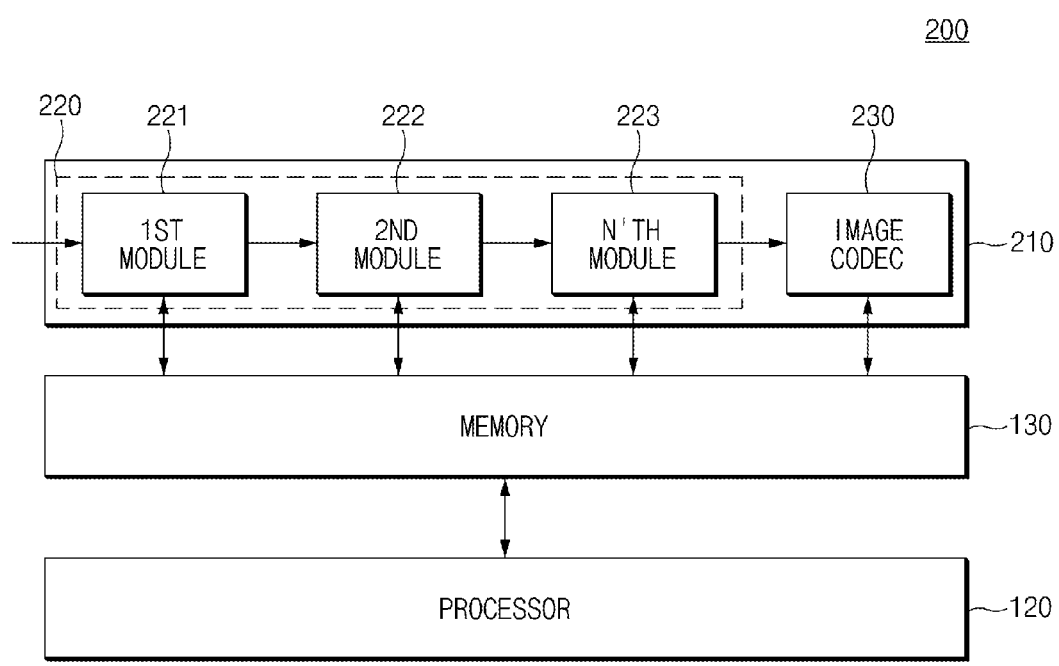
FIG. 2 is a block diagram illustrating an electronic device according to various embodiments of the present disclosure.

FIG. 2 is a block diagram illustrating an electronic device according to various embodiments of the present disclosure.

Referring to FIG. 2, an image processor 210 is exemplified for the image processor 170 illustrated in FIG. 1. FIG. 2 is prepared for description with an operation performed by the image processor 210. An electronic device 200 may include the image processor 210, a processor 120, and a memory 130, whereas various embodiments of the present disclosure may not be restrictive hereto. According to various embodiments, the electronic device 200 may further include at least one of other elements among the elements illustrated in FIG. 1.

The image processor 210 may include an image pipeline 220 and an image codec 230. In various embodiments, the image processor 210 may exclude at least one of the elements or may further include other elements.

The image pipeline 220 may include a plurality of image processing modules 221, 222, and 223 performing image processing operations of an image, which is input into the image pipeline 220, by stages. An image input into the image pipeline 220 may become an image or motion picture which is received through an image sensor. Various embodiments of the present disclosure may not be restrictive hereto and an input image of the image pipeline may include all kinds of images which can be processed through the image pipeline. If an image is processed through the plurality of image processing modules 221, 222, and 223 in the image pipeline 220, image-processed image data may be obtained from the image pipeline 220.

The plurality of image processing modules 221, 222, and 223 may be, for example, at least one of modules performing black level compensation (BLC), automatic white balance (AWB), automatic exposure (AE), lens shading (LS), edge extraction (EE), color correction (CC), noise reduction (NR), and scaling. Additionally, the plurality of image processing modules may be at least one of modules performing diverse image processing operations executable in an image obtaining process through an image sensor, or achieving image quality improvement for obtaining more clear and qualified images.

According to various embodiments, the image pipeline 220 may include N-numbered image processing modules (e.g., a first module 221, a second module 222, . . . , and an N'th module 223; where N is a natural number).

Each image processing module of the image pipeline 220 may perform an image processing operation with an image, which is input thereto, and may transfer the processed image to the next image processing module of the image pipeline 220. In this case, temporary information, i.e., volatile information, about an image input into each image processing module may be obtained during the image processing process. Volatile information may be obtained during an image processing process in an image codec in addition to each image processing module of the image pipeline 220.

Table 1 summarizes examples of volatile information obtained from the plurality of image processing modules 221, 222, and 223 of the image pipeline 220.

TABLE 1

| Image processing module | Volatile information |
| --- | --- |
| Black level compensation (BLC) module | Black level of image |
| Automatic white balance (AWB) module | External illumination environment (color temperature) |
| Automatic exposure (AE) module | The overall average brightness of image |
| Lens shading (LS) module | Pixel brightness level of image |
| Edge extraction (EE) module | Pixel high-frequency information of image |
| Color correction (CC) module | Color distortion information of image |
| Noise reduction (NR) | Presence/absence of pixel noise in image, Noise intensity, Noise types |
| Scaling module | Pixel high-frequency information of image (pattern information, distribution) |
| Image codec | Motion vector (in the unit of microblock (MB)) |

For example, black level information of an image may be obtained from a BLC module. Otherwise, a pixel brightness level of an image may be obtained from an LS module. In addition to the volatile information shown in Table 1, a variety of volatile information may be obtained respectively from the image processing modules.

As such, obtained volatile information may be stored in the memory 130. According to various embodiments, in storing volatile information, a reference unit may be variable depending on types of volatile information, for example, in the unit of pixel, block, or frame. For example, brightness level information obtained from an LS module may be stored in the unit of block and noise information obtained from an NR module may be stored in the unit of pixel.

According to various embodiments, the image processor 210 may store volatile information based on a hierarchical structure grouping similar information in different scale ratios by layers. This feature will be described in conjunction with FIGS. 3A to 3D.

According to various embodiments, volatile information may be stored in a header of a storage format of image data which are fully image-processed by stages in the image pipeline. This feature will be described in conjunction with FIG. 4.

According to various embodiments, the memory 130 may store volatile information which is processed through the image processor 210 or the processor 120. For example, the memory 130 may store brightness edge information as volatile information which is processed from edge information by excluding color information from the edge information obtained from a scaling module.

According to various embodiments, the image processor 210 may be used for storing information, which is obtained from an image sensor, another sensor, or a sensor hub, together with volatile information, or for processing volatile information in the image processor 210 or the processor 120.

The image processor 210 (or the processor 120) may use volatile information in at least one of post-processing an image output from the image pipeline 220, processing image data in the image codec 230, or processing image data in an application of the electronic device 200.

According to various embodiments, the image processor 210 may use volatile information, which is obtained from at least one first image processing module of the plurality of image processing modules 221, 222, and 223, in an image-processing operation of a second image processing module which is placed at the next stage of the first image processing module. A second image processing module may be placed at the next stage of a first image processing module. A second processing module may be one of processing modules placed at not only the immediate next stage but also the next but one stage.

For example, edge information of an image obtained from a scaling module may be used in an edge reinforcing work of an EE module which is placed at the next stage of the scaling module. In an embodiment of the present disclosure, assuming a scaling module as a first module 221, an EE module may be one of a second to N'th modules. In such an EE module, edge information stored in the memory 130 may be used without additional edge extraction during an edge reinforcing work.

According to various embodiments, the image processor 210 may be employed to use voltage information for processing image data in the image codec 230. For example, an NR module may extract temporal information by image pixels and may differentiate whether the corresponding pixel is involved in noise or motion. The NR module may eliminate noises based on a result of the differentiation. Information about the presence/absence of image pixel motion may be obtained as volatile information from the NR module. The presence/absence information of image pixel motion may be stored in the memory 130. The image codec 230 may retrieve the presence/absence information of image pixel motion from the memory 130 and may utilize the presence/absence information of image pixel motion to obtain a motion vector necessary for encoding or decoding an image.

The memory 130 may store a motion vector, which is obtained by processing the presence/absence information of image pixel motion, instead of the presence/absence information of image pixel motion. For example, assuming that the presence/absence information of image pixel motion is processed for use, the processor 120 may process the presence/absence information of image pixel motion into a motion vector and may store the processed motion vector in the memory 130. Therefore, as calculation of converting the presence/absence information of image pixel motion into a motion vector can be omitted in utilizing the presence/absence information of image pixel motion by the image codec 230, an image post-processing module (not shown), or an application, it may be allowable to further reduce an amount of computation by storing the processed volatile information.

According to various embodiments, the image processor 210 or the processor 120 may use volatile information, which is stored in the memory 130, for post-processing image data. For example, the image processor 210 may perform a secondary image post-processing operation with image data primarily obtained through the image pipeline, which processes an image, while an image sensor is obtaining the image. The image post-processing operation may be performed in the processor 120, the image processor 210, an image post-processing module, or an image post-processing pipeline.

For example, in the case that a user edits an image, such as by resizing primarily obtained image data, correcting a color or brightness of an image, or converting a color mode, the electronic device 200 may perform an image post-processing operation based on an input of the user. As an example, in the case that a user conducts an image post-processing operation with anti-aliasing detail enhancement (AADE) for image data, which is primarily obtained through the image pipeline 220, the image processor 210 or the processor 120 may utilize edge information, which is obtained from an image processing process through the image pipeline, in removing an aliasing effect and reinforcing details to reduce an amount of calculation which increases due to unnecessary edge extraction.

Additionally, volatile information may be utilized for a complicated post-processing operation such as computational photography (CP). The image processor 210 may utilize volatile information for a CP operation, which has a large amount of calculation, to greatly reduce the amount of calculation and thereby to accomplish a real-time processing for an image.

According to various embodiments, the image processor 210 or the processor 120 may use volatile information of the corresponding image in utilizing image data in an application. For example, an application utilizing volatile information may include diverse applications for utilizing the image data obtained from the image pipeline 220, such as an application editing an image, an application recognizing a specific object from an image, an application extracting a part of objects from an image, or an application recognizing characters from an image.

For example, in the case of performing optical character recognition (OCR) for image data primarily obtained from the image pipeline 220, a character recognizing application may use edge information obtained from an image processing process through the image pipeline 220. The character recognizing application may extract edges from image data, may perform an image matching operation based on the extracted edge information, and may recognize characters. The character recognizing application may retrieve edge information from the memory 130, without edge extraction from image data, may perform an image matching operation based on the retrieved edge information, and may reduce an amount of calculation by half Additionally, it may be possible to reduce a character recognition speed in the character recognizing application.

Further, the processor 120 or the image processor 210 may utilize volatile information even in a complicated calculation such as computer vision (CV). It may be possible to greatly reduce the total amount of calculation used in performing a CV operation by the processor 120 and thereby it may be possible even for a mobile electronic device such as smart phone to provide a high-level function with CV.

According to various embodiments, an electronic device may include a memory configured to store image data, and a processor functionally connected with the memory and including an image processing module configured to process an image, wherein the processor may be configured to obtain image data that is processed for the image and to store volatile information that is temporarily obtained from the image during the image processing.

According to various embodiments, the electronic device may further include an image pipeline formed of a plurality of image processing modules configured to process an image by stages, wherein the processor may be configured to obtain the image data, which is processed for the image in stages, from the image pipeline and to store the volatile information, which is obtained from at least one of the plurality of image processing modules, in the memory.

According to various embodiments, the electronic device may further include a second processor configured to process the volatile information, wherein the second processor may be configured to store the processed volatile information in the memory.

According to various embodiments, the processor may process the volatile information in storage units differentiated by types of the volatile information.

According to various embodiments, the processor may be configured to store the volatile information in a header of a storage format of the image data based on a hierarchical structure grouping similar information in different scale ratios by layers.

According to various embodiments, the processor may be configured to allow the volatile information to have different layers by types of the volatile information.

According to various embodiments, the processor may be configured to encode the total number of layers of the hierarchical structure and the scale ratios by the layers in security keys and to store the encoded security keys in a security field of the header.

According to various embodiments, the processor may be configured to determine layers, which accord to types of the volatile information, based on at least one of a reference unit for storage, complexity of the image, or similarity with adjacent information.

According to various embodiments, the processor may be configured to use volatile information, which is obtained from at least a first image processing module of the plurality of image processing modules, for an image processing operation of a second image processing module placed at the next stage of the first image processing module in the image pipeline.

According to various embodiments, the processor may be configured to use the volatile information in post-processing the image data.

According to various embodiments, the processor may include an image codec, wherein the image codec may be configured to use the volatile information for an image processing operation with the image data.

According to various embodiments, the processor may be configured to use the volatile information in utilizing the image data through an application.

According to various embodiments, the volatile information may be at least one of black level, color temperature, average brightness, positional brightness information, positional high-frequency information, color distortion information, positional noise information, edge information, and temporal information of the image.

According to various embodiments, the electronic device may further include a communication interface, wherein the processor may be configured to share the volatile information of the image with other electronic device through the communication interface.

FIGS. 3A to 3D are schematic diagrams illustrating processes of grouping similar information with different scale ratios by types of volatile information according to various embodiments of the present disclosure.

Figure 3A:
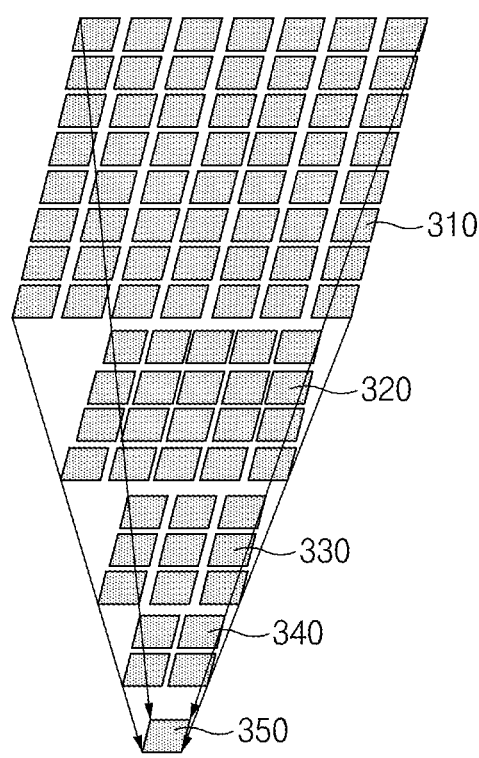
FIGS. 3A to 3D are schematic diagrams illustrating processes of grouping similar information with different scale ratios by types of volatile information according to various embodiments of the present disclosure.

FIG. 3A illustrates a hierarchical structure for grouping similar information in different scale ratios. The hierarchical structure may be formed of N-numbered layers. The layers may be different from each other depending on the type of volatile information. The total number of layers, N, may be determined by the complexity of an image.

For example, referring to FIG. 3A, the hierarchical structure may be formed of four layers (a first layer 320, a second layer 330, a third layer 340, and a fourth layer 350) which have different scale ratios each other to a reference scale 310 which has the scale of the original image. For example, the image processor 170 may determine noise information, which is obtained from an NR module, as the second layer 330, and may determine scaling information, which is obtained from a scaling module, as the third layer 340. The layer according to a type of volatile information may be determined based at least one of a reference unit (pixel, block, or frame), similarity with adjacent information, and complexity of an image.

According to an embodiment, the image processor 170 may determine the total number of layers of the hierarchical structure based in the image complexity and may determine layer scale ratios for grouping similar information in accordance with the total number of layers. The total number of layers and the layer scale ratios may be encoded by security keys. The image processor 170 may determine a reference unit of storage, according to types of volatile information obtained respectively from the image processing modules of the image pipeline, and may determine a layer of the corresponding volatile information based on the reference unit of storage. The image processor 170 may change a layer, which is determined for the corresponding volatile information, in accordance with the similarity with adjacent information (e.g., adjacent pixels, adjacent blocks, or adjacent frames) to the corresponding volatile information.

Figure 3B:
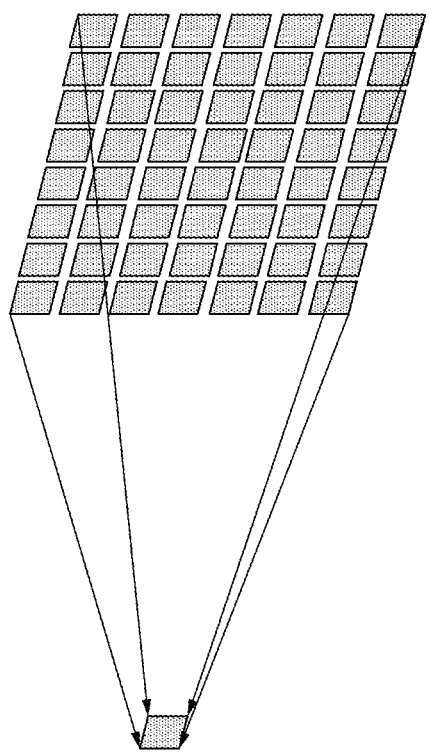
Figure 3C:
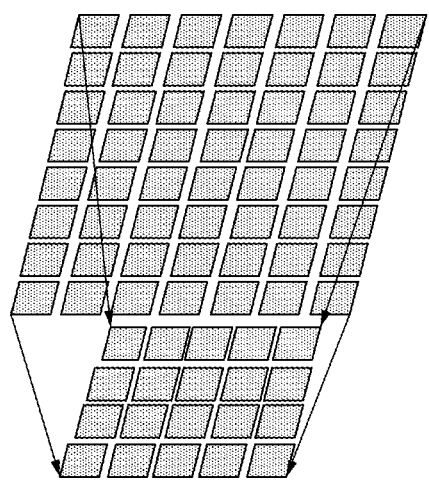
Figure 3D:
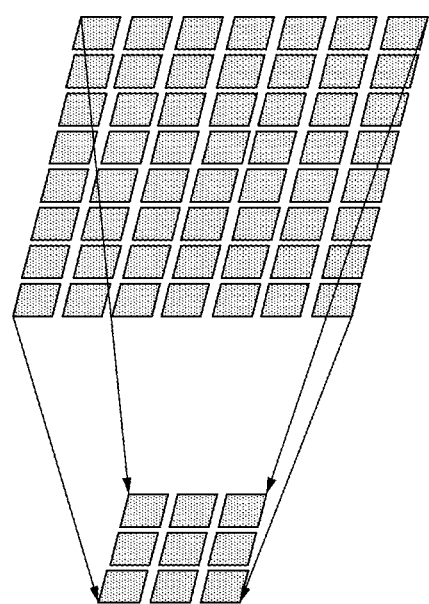

FIGS. 3B, 3C, and 3D illustrate layers determined by types of volatile information. For example, FIG. 3B illustrates a layer determined for volatile information (e.g., the total average brightness of an image) obtained form an AE module. As the volatile information obtained from the AE module indicates the total average brightness to the whole image, the image processor 170 may determine the volatile information as the fourth layer 350.

For example, FIG. 3C illustrates a layer determined for noise information (e.g., presence/absence of image pixel motion) obtained from an NR module. Volatile information obtained from the NR module indicates the presence/absence of image pixel motion and the image processor 170 may determine the volatile information as the second layer 330 in accordance with the similarity with adjacent pixels.

For example, FIG. 3D illustrates a layer determined for high frequency information (e.g., image pixel high-frequency information) obtained from a scaling module. Volatile information obtained from the scaling module indicates image pixel high-frequency information and the image processor 170 may determine the volatile information as the third layer 340 in accordance with the similarity with adjacent pixels.

FIGS. 3B, 3C, and 3D illustrate examples of determining layers of volatile information by types of the volatile information, but the layers of volatile information may not be restrictive hereto.

As described above, the image processor 170 may efficiently store volatile information based on a hierarchical structure grouping similar information in different scale ratios in accordance with layers.

Figure 4:
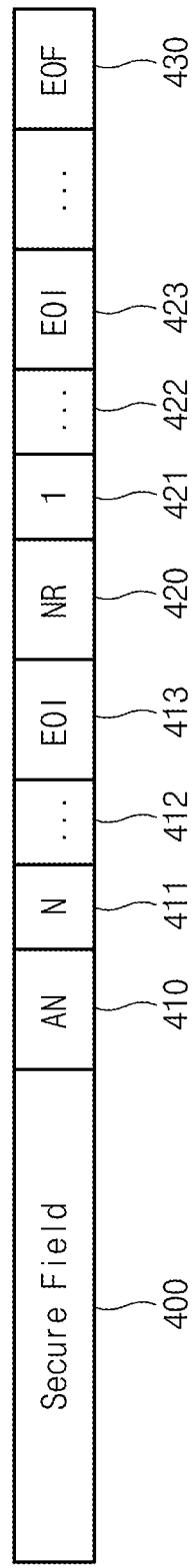
FIG. 4 illustrates an example of storing volatile information in a header of a storage format of image data according to various embodiments of the present disclosure.

FIG. 4 illustrates an example of storing volatile information in a header of a storage format of image data according to various embodiments of the present disclosure.

A plurality of types of volatile information for an image obtained from an image pipeline may be stored with a standard format in a header of image data.

For example, image data processed through an image pipeline may be encoded by an image codec and may be stored with a storage format, such as joint photographic experts group (JPEG) or MPEG, in a memory. In each storage format, image data may be stored in a body of the storage format and a plurality of types of volatile information may be stored in a header of the storage format. According to an amount of volatile information, the volatile information may be stored in an extension field of the storage format.

Referring to FIG. 4, the image processor 170 may store different types of volatile information, which are grouped in different scale ratios by types of the volatile information for one image, in a header of image data based on the hierarchical structure described in conjunction with FIGS. 3A to 3D. For example, as illustrated in FIG. 4, a standard format may be repeated for a plurality of types of volatile information in the pattern of indicators (e.g., 410 and 420) of the corresponding volatile information, layers (e.g., 411 and 421) determined for the corresponding volatile information, information (412 and 422) grouped by the determined layers, and indicators (end of information (EOI)) (e.g., 413 and 423) informing that the corresponding volatile information is the end of information. An indicator (end of field (EOF)) 430, which informs of the end of field, may be placed at the end position of volatile information in the standard format. In the standard format, the total number of layers of the hierarchical structure and the scale ratios may be encoded and stored in a security field 400 of the header.

As such, the image processor 170 may store a plurality of types of volatile information for an image by using a standard format and thereby may reduce an amount of the stored volatile information.

Figure 5:
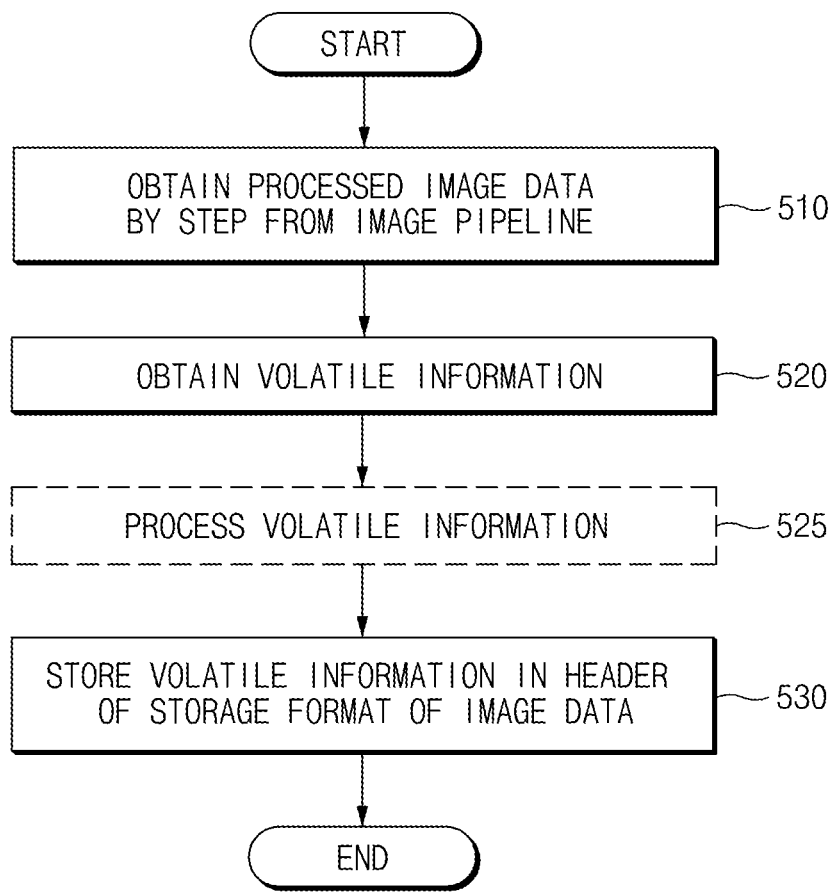
FIG. 5 is a flowchart showing an image processing method according to various embodiments of the present disclosure.

FIG. 5 is a flowchart showing an image processing method according to various embodiments of the present disclosure.

Referring to FIG. 5, the image processing method may be composed of operations processed through the electronic device 101 illustrated in FIG. 1. For matters omitted in this embodiment, the aforementioned description relevant to the electronic device 101 of FIG. 1 may also be applied to the image processing method shown in FIG. 5.

At operation 510, the image processor 170 may obtain image data which are processed by stages through an image pipeline.

At operation 520, the image processor 170 may obtain volatile information, which is temporarily generated during an image processing process by the corresponding image processing module, from at least one of a plurality of image processing modules of the image pipeline.

At operation 530, the image processor 170 may store the volatile information in a header of a storage format of the image data. For example, the image processor 170 may store a plurality of the volatile information in the header based on a hierarchical structure grouping similar information with different scale ratios in accordance with layers.

According to various embodiments, the image processing method shown in FIG. 5 may further include operation 525. At operation 525, the image processor 170 or the processor 120 may process the volatile information which is temporarily obtained from each image processing module of the image pipeline. In this case, at operation 530, the image processor 170 may store the volatile information in the header by types of the volatile information. For example, the header may store the volatile information in a part and the processed volatile information in other part.

According to various embodiments, an image processing method may include obtaining image data that is processed from an image processing module processing an input image, and storing volatile information of the image in a header of a storage format of the image data, wherein the volatile information may be temporarily obtained from the image during an image processing process of the image processing module.

According to various embodiments, the obtaining of the image data may include obtaining the image data that is processed by stages through an image pipeline formed of a plurality of image processing modules processing the image by stages, wherein the volatile information may be temporarily obtained during an image processing process of a corresponding one of the plurality of image processing modules in the image pipeline.

According to various embodiments, the storing of the volatile information may include processing the volatile information and storing the processed volatile information, or storing the volatile information based on a hierarchical structure grouping similar information in different scale ratios by layers.

According to various embodiments, the total number of layers of the hierarchical structure, and the scale ratios by the layers, may be encoded into security keys to be stored in a security field of the header, wherein layers, which accord to types of the volatile information, may be determined based on at least one of a reference unit for storage, complexity of the image, or similarity with adjacent information.

According to various embodiments, the obtaining of the image data may include, in processing the input image by stages along the image pipeline in the plurality of image processing module, using volatile information, which is obtained from at least a first image processing module of the plurality of image processing modules, for an image processing operation of a second image processing module placed at the next stage of the first image processing module in the image pipeline, and obtaining the image data from the image pipeline.

According to various embodiments, the image processing method may further include utilizing the volatile information in at least one of post-processing the image data, processing the image data through an image codec, or processing the image data through an application.

According to various embodiments, the volatile information may be at least one of black level, color temperature, average brightness, positional brightness information, positional high-frequency information, color distortion information, positional noise information, edge information, and temporal information of the image.

Figure 6:
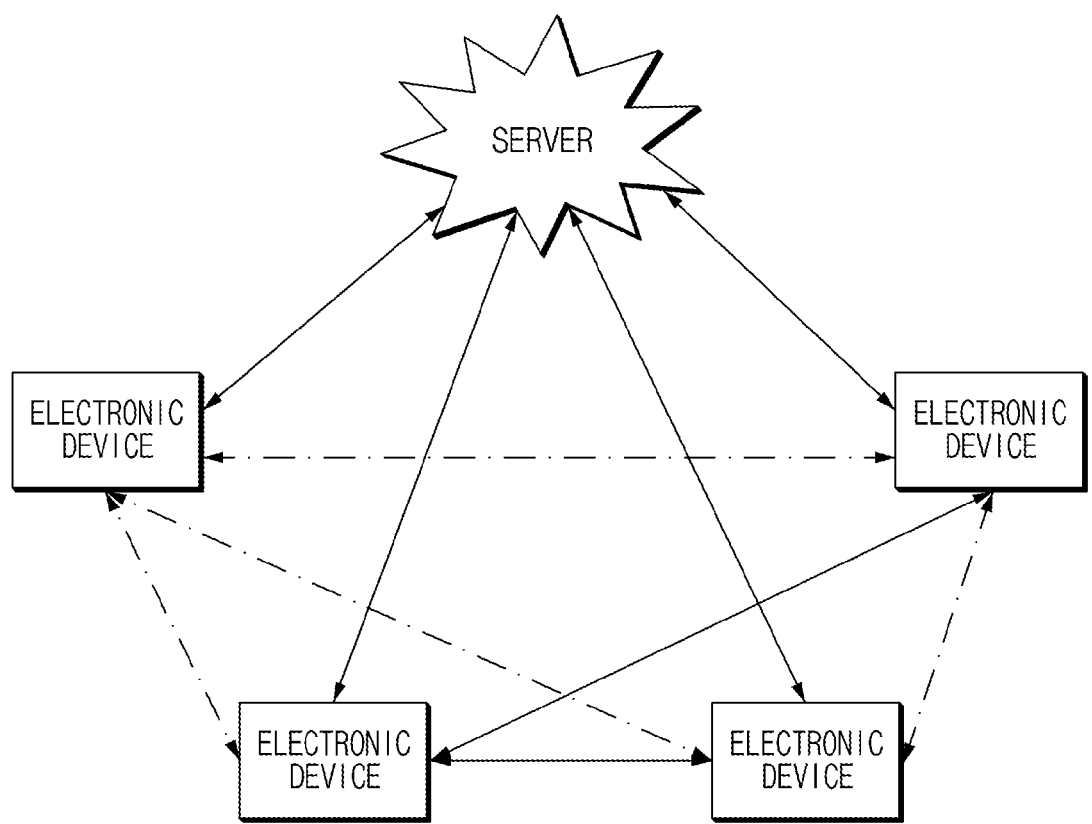
FIG. 6 is a schematic diagram illustrating an example of sharing volatile image information by a plurality of electronic devices according to various embodiments of the present disclosure.

FIG. 6 is a schematic diagram illustrating an example of sharing volatile image information by a plurality of electronic devices according to various embodiments of the present disclosure.

Referring to FIG. 6, if one electronic device stores volatile information of an image (or motion picture) in a memory 130, the electronic device may permit the volatile information of the corresponding image to be shared by other electronic devices through a communication interface 160 (e.g., NFC, WiFi, Bluetooth low energy (BLE), Zigbee, LiFi, ultrasonic communication, optical communication, Zware, or LTE).

According to various embodiments, a plurality of electronic devices may share volatile information of the same image or motion picture through a server. For example, the server may include diverse types (e.g., cloud server, social networking service (SNS) server, dispersion computing server, storage server, or content delivery network (CDN)) connected through the internet or an entity (e.g., WiFi AP, LTE evolved Node B (eNodeB), mobility management entity (MME), or LTE application server) included in the network. For example, if an electronic device A obtains volatile information of a motion picture B, the electronic device C may retrieve the volatile information of the motion picture B from the electronic device A through a cloud server and may utilize the volatile information in editing or processing the motion picture B through an application stored therein.

According to various embodiments, volatile information may not only be generated and shared through an image pipeline at the time of obtaining an image through an image sensor, but also generated and shared during image edition, image post-processing, or image processing through an application after the image is obtained.

According to various embodiments, volatile information shared by electronic devices may be volatile information which has the standard format shown in FIG. 4.

Figure 7:
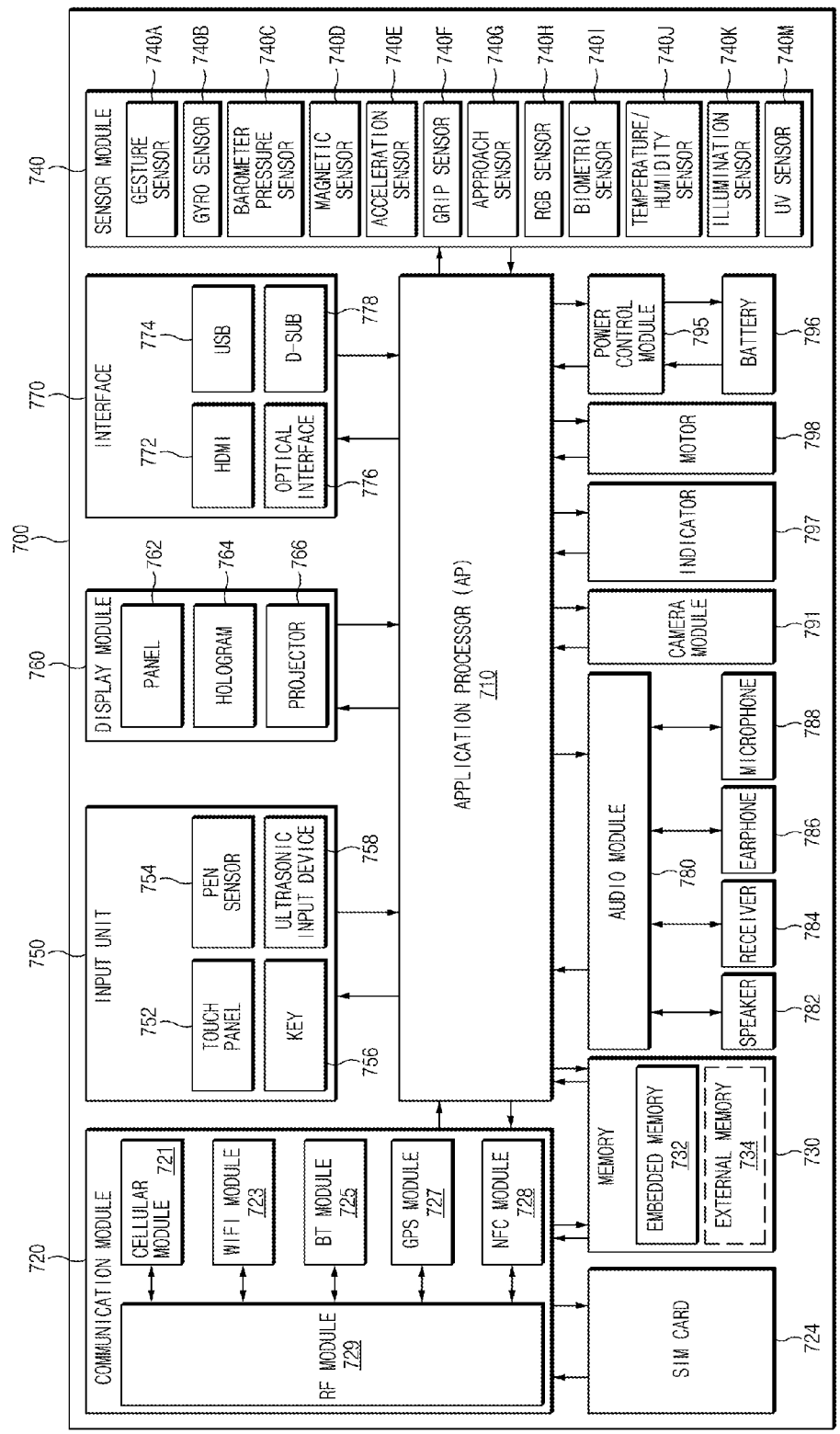
FIG. 7 is a block diagram illustrating an electronic device according to various embodiments of the present disclosure.

FIG. 7 is a block diagram illustrating an electronic device according to various embodiments of the present disclosure.

Referring to FIG. 7, the electronic device 700 may include at least one of one or more APs 710, a communication module 720, a subscriber identification module (SIM) card 724, a memory 730, a sensor module 740, an input unit 750, a display 760, an interface 770, an audio module 780, a camera module 791, a power management module 795, a battery 796, an indicator 797, or a motor 798.

The processor 710 may drive an OS or an application to control a plurality of hardware or software elements connected to the processor 710 and may process and compute a variety of data including multimedia data. The processor 710 may be implemented with a system-on-chip (SoC), for example. According to an embodiment, the processor 710 may further include a graphic processing unit (GPU) and/or an image signal processor (ISP). The processor 710 may include at least a part of the elements (e.g., a cellular module 721) shown in FIG. 7. The processor 710 may process instructions or data, which are received from at least one of other elements (e.g., a nonvolatile memory), and store diverse data into such a nonvolatile memory.

The communication module 720 may have a configuration that is the same as or similar to the communication interface 160 of FIG. 1. The communication module 720 may include the cellular module 721, a WiFi module 723, a Bluetooth module 725, a GPS module 727, an NFC module 728, and a radio frequency (RF) module 729.

The cellular module 721 may provide a voice call, a video call, a character service, or an Internet service through a communication network. According to an embodiment, the cellular module 721 may perform discrimination and authentication of an electronic device within a communication network using a SIM (e.g., a SIM card) 724. According to an embodiment, the cellular module 721 may perform at least a portion of functions provided by the processor 710. According to an embodiment, the cellular module 721 may include a CP.

Each of the WiFi module 723, the Bluetooth module 725, the GPS module 727, and the NFC module 728 may include a processor for processing data exchanged through a corresponding module, for example. In various embodiments, at least a part (e.g., two or more elements) of the cellular module 721, the WiFi module 723, the Bluetooth module 725, the GPS module 727, and the NFC module 728 may be included within one integrated circuit (IC) or an IC package.

The RF module 729 may transmit and receive, for example, communication signals (e.g., RF signals). The RF module 729 may include a transceiver, a power amplifier module (PAM), a frequency filter, a low noise amplifier (LNA), or an antenna. According to another embodiment, at least one of the cellular module 721, the WiFi module 723, the Bluetooth module 725, the GPS module 727, and the NFC module 728 may transmit and receive an RF signal through a separate RF module.

The SIM card 724 may include, for example, a card, which has a SIM, and/or an embedded SIM, and include unique identifying information (e.g., integrated circuit card identifier (ICCID)) or subscriber information (e.g., integrated mobile subscriber identify (IMSI)).

The memory 730 (e.g., the memory 130) may include, for example, an embedded memory 732 or an external memory 734. For example, the embedded memory 732 may include at least one of a volatile memory (e.g., a dynamic random access memory (DRAM), a static RAM (SRAM), a synchronous dynamic RAM (SDRAM), etc.), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.), a hard drive, or a solid state drive (SSD).

The external memory 734 may further include a flash drive, for example, a compact flash (CF), a secure digital (SD), a micro-SD, a mini-SD, an extreme digital (xD), or a memory stick. The external memory 734 may be functionally connected with the electronic device 700 through various interfaces.

The sensor module 740 may measure, for example, a physical quantity, or detect an operation state of the electronic device 700, to convert the measured or detected information to an electric signal. The sensor module 740 may include at least one of a gesture sensor 740A, a gyro sensor 740B, a barometer pressure sensor 740C, a magnetic sensor 740D, an acceleration sensor 740E, a grip sensor 740F, a proximity sensor 740G, a color sensor 740H (e.g., red, green, and blue (RGB) sensor), a biometric sensor 740I, a temperature/humidity sensor 740J, an illuminance sensor 740K, or an ultraviolet (UV) sensor 740M. Additionally or generally, though not shown, the sensor module 740 may further include an E-nose sensor, an electromyography sensor (EMG) sensor, an electroencephalogram (EEG) sensor, an electrocardiogram (ECG) sensor, an infrared (IR) sensor, an iris sensor, or a fingerprint sensor, for example. The sensor module 740 may further include a control circuit for controlling at least one or more sensors included therein. In various embodiments, the electronic device 700 may further include a processor, which is configured to control the sensor module 740, as a part or additional element, thus controlling the sensor module 740 while the processor 710 is in a sleep state.

The input unit 750 may include, for example, a touch panel 752, a (digital) pen sensor 754, a key 756, or an ultrasonic input unit 758. The touch panel 752 may recognize, for example, a touch input using at least one of a capacitive type, a resistive type, an infrared type, or an ultrasonic wave type. Additionally, the touch panel 752 may further include a control circuit. The touch panel 752 may further include a tactile layer to provide a tactile reaction for a user.

The (digital) pen sensor 754 may be a part of the touch panel 752, or a separate sheet for recognition. The key 756, for example, may include a physical button, an optical key, or a keypad. The ultrasonic input unit 758 may allow the electronic device 700 to detect a sound wave using a microphone (e.g., a microphone 788), and to determine data through an input tool generating an ultrasonic signal.

The display 760 (e.g., the display 150) may include a panel 762, a hologram device 764, or a projector 766. The panel 762 may include the same or similar configuration with the display 150 of FIG. 1. The panel 762, for example, may be implemented to be flexible, transparent, or wearable. The panel 762 and the touch panel 752 may be implemented with one module. The hologram device 764 may show a three-dimensional image in a space using interference of light. The projector 766 may project light onto a screen to display an image. The screen, for example, may be positioned in the inside or outside of the electronic device 700. According to an embodiment, the display 760 may further include a control circuit for controlling the panel 762, the hologram device 764, or the projector 766.

The interface 770, for example, may include an HDMI 772, a USB 774, an optical interface 776, or a D-subminiature (D-sub) 778. The interface 770 may include, for example, the communication interface 160 shown in FIG. 1. The interface 770, for example, may include a mobile high definition link (MHL) interface, an SD card/multi-media cared (MMC) interface, or an Infrared data association (IrDA) standard interface.

The audio module 780 may convert a sound and an electric signal in dual directions. At least one element of the audio module 780 may include, for example, the I/O interface 140 shown in FIG. 1. The audio module 780, for example, may process sound information that is input or output through a speaker 782, a receiver 784, an earphone 786, or the microphone 788.

The camera module 791 may be a unit which is capable of taking a still picture and a moving picture. According to an embodiment, the camera module 791 may include one or more image sensors (e.g., a front sensor or a rear sensor), a lens, an ISP, or a flash (e.g., an LED or a xenon lamp).

The power management module 795 may manage, for example, power of the electronic device 700. The power management module 795 may include, for example, a power management IC (PMIC), a charger IC, or a battery or fuel gauge. The PMIC may operate in a wired and/or wireless charging mode. A wireless charging mode may include, for example, diverse types of magnetic resonance, magnetic induction, or electromagnetic wave. For the wireless charging, an additional circuit, such as a coil loop circuit, a resonance circuit, or a rectifier, may be further included therein. The battery gauge, for example, may measure a remnant of the battery 796, a voltage, a current, or a temperature during charging. The battery 796 may measure, for example, a residual capacity, a voltage or charge, a current, or a temperature thereof. The battery 796 may include, for example, a rechargeable battery and/or a solar battery.

The indicator 797 may display a state of the electronic device 700 or a part (e.g., the processor 710) thereof such as a booting state, a message state, or a charging state. The motor 798 may convert an electric signal into mechanical vibration and generate a vibration or haptic effect. Although not shown, the electronic device 700 may include a processing unit (e.g., a GPU) for supporting a mobile TV. The processing unit for supporting the mobile TV, for example, may process media data that is based on the standard of digital multimedia broadcasting (DMB), digital video broadcasting (DVB), or media flow (MediaFlo™).

Figure 8:
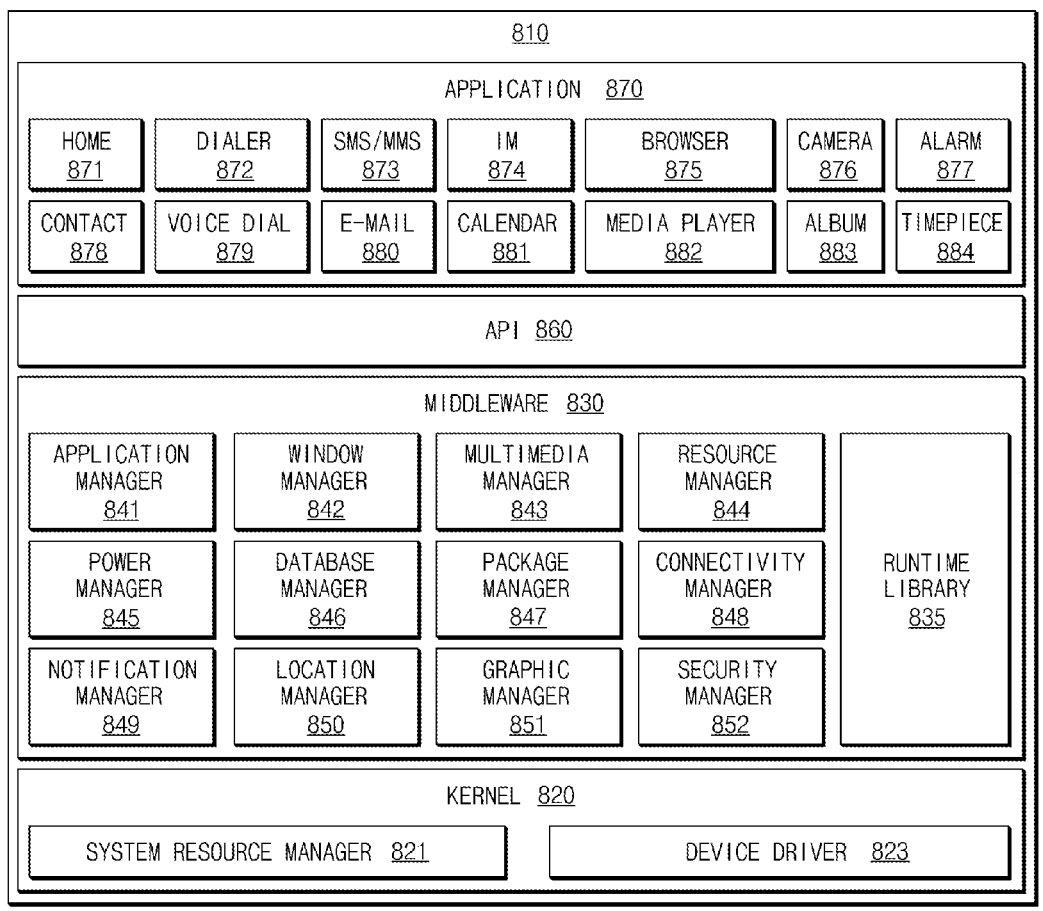
FIG. 8 is a block diagram illustrating a program module according to various embodiments of the present disclosure.

FIG. 8 is a block diagram illustrating a program module according to various embodiments of the present disclosure.

Referring to FIG. 8, the program module 810 may include configurations relevant to the program 140 which is described above in conjunction with FIG. 1. For example, the program module 810 may include an OS to control resources relevant to an electronic device (e.g., the electronic device 101), and/or diverse applications (e.g., the application program 137) driven on the OS. The OS may be, for example, android, iOS, windows, symbian, tizen, or bada.

The program module 810 may include a kernel 820, a middleware 830, an API 860, and an application 870. At least a part of the program module 810 may be preloaded on an electronic device, or may be downloadable from an external electronic device (e.g., the electronic device 102, 104, or 106).

The kernel 820 (e.g., the kernel 131 of FIG. 1) may include, for example, a system resource manager 821 or a device driver 823. The system resource manager 821 may perform control, allocation, or retrieval of system resources. According to an embodiment, the system resource manager 821 may include a process managing part, a memory managing part, or a file system managing part. The device driver 823 may include, for example, a display driver, a camera driver, a Bluetooth driver, a common memory driver, an USB driver, a keypad driver, a WiFi driver, an audio driver, or an inter-process communication (IPC) driver.

The middleware 830 may provide, for example, a function necessary for the application 870 in common, or provide diverse functions to the application 870 through the API 860 to allow the application 870 to efficiently use limited system resources of the electronic device. According to an embodiment, the middleware 830 (e.g., the middleware 133) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, or a security manager 852.

The runtime library 835 may include, for example, a library module which is used by a compiler to add a new function through a programming language while the application 870 is being executed. The runtime library 835 may perform I/O management, memory management, or capacities about arithmetic functions.

The application manager 841 may manage, for example, a life cycle of at least one application of the application 870. The window manager 842 may manage a graphical user interface (GUI) resource which is used in a screen. The multimedia manager 843 may identify a format necessary for playing diverse media files, and perform an encoding or decoding work for media files by using a codec suitable for the format. The resource manager 844 may manage resources such as a storage space, memory, or source code of at least one application of the application 870.

The power manager 845, for example, may operate with a basic input/output system (BIOS) to manage a battery or power, and provide power information for an operation of an electronic device. The database manager 846 may generate, search, or modify a database which is to be used in at least one application of the application 870. The package manager 847 may install or update an application which is distributed in a form of package file.

The connectivity manager 848 may manage, for example, wireless connection such as WiFi or Bluetooth. The notification manager 849 may display or notify of an event such as arrival of a message, a scheduled event, or a proximity notification in a mode that does not disturb a user. The location manager 850 may manage location information of an electronic device. The graphic manager 851 may manage a graphic effect that is provided to a user, or manage a UI relevant thereto. The security manager 852 may provide a general security function necessary for system security or user authentication. According to an embodiment, if an electronic device (e.g., the electronic device 101) includes a telephony function, the middleware 830 may further includes a telephony manager for managing a voice or image call function of the electronic device.

The middleware 830 may include a middleware module to form a combination of diverse functions of the above-described elements. The middleware 830 may provide a specialized module by a kind of OS for the purpose of offering differentiated functions. Additionally, the middleware 830 may remove a part of the preexisting elements, dynamically, or add a new element thereto.

The API 860 (e.g., the API 135) may be, for example, a set of programming functions, and may be provided in a configuration which is variable depending on an OS. For example, if an OS is android or iOS, it may be permissible to provide one API set per platform. If an OS is tizen, it may be permissible to provide two or more API sets per platform.

The application 870 (e.g., the application 137) may include, for example, one or more applications capable of providing functions for a home 871, a dialer 872, a short message service (SMS)/multimedia messaging service (MMS) 873, an instant message (IM) 874, a browser 875, a camera 876, an alarm 877, a contact 878, a voice dial 879, an e-mail 880, a calendar 881, a media player 882, an album 883, and a timepiece 884, or for offering health care (e.g., measuring an exercise quantity or blood sugar) or environmental information (e.g., atmospheric pressure, humidity, or temperature).

According to an embodiment, the application 870 may include an application (hereinafter, referred to as "information exchanging application" for descriptive convenience) to support information exchange between the electronic device (e.g., the electronic device 101) and an external electronic device (e.g., the electronic device 102, 104, or 106). The information exchanging application may include, for example, a notification relay application for transmitting specific information to the external electronic device, or a device management application for managing the external electronic device.

For example, the notification relay application may include a function of transmitting notification information, which arises from other applications (e.g., the applications for SMS/MMS, e-mail, health care, or environmental information), to an external electronic device (e.g., the electronic device 102 or 104). Additionally, the notification relay application may receive notification information from an external electronic device and may provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 102 or 104) which communicates with the electronic device 100, an application operating in the external electronic device, or service (e.g., call service or message service) provided from the external electronic device.

According to an embodiment, the application 870 may include an application (e.g., a health care application) which is assigned thereto in accordance with a property (e.g., a property of a mobile medical device as a kind of electronic device) of the external electronic device (e.g., the electronic device 102, 104, or 106). According to an embodiment, the application 870 may include an application which is received from an external electronic device (e.g., the electronic device 102, 102, or 106). According to an embodiment, the application 870 may include a preloaded application or a third party application which is downloadable from a server. The titles of the program module 810 according to the illustrated embodiment may be modifiable depending on kinds of OSs.

According to various embodiments, at least a part of the program module 810 may be implemented in software, firmware, hardware, or at least two or more combinations among them. At least a part of the program module 810, for example, may be implemented (e.g., executed) by a processor (e.g., the processor 120). At least a part of the program module 810 may include, for example, a module, a program, routine, a set of instructions, or a process for performing one or more functions.

Each of the above-described elements of the electronic device according to an embodiment of the present disclosure may be implemented using one or more components, and a name of a relevant component may vary with the kind of the electronic device. The electronic device according to various embodiments of the present disclosure may include at least one of the above components. Also, a part of the components may be omitted, or additional components may be further included. Also, some of the components of the electronic device according to the present disclosure may be combined to form one entity, thereby making it possible to perform the functions of the relevant components substantially the same as before the combination.

The term "module" used for the present disclosure, for example, may mean a unit including one of hardware, software, and firmware or a combination of two or more thereof. A "module", for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to various embodiments of the present disclosure may include at least one of an application-specific integrated circuit (ASIC) chip performing certain operations, a field-programmable gate arrays (FPGAs), or a programmable-logic device, those of which have been known or to be developed in the future.

At least a part of an apparatus (e.g., modules or functions thereof) or a method (e.g., operations) according to various embodiments of the present disclosure, for example, may be implemented by instructions stored in a computer-readable storage medium in the form of a programmable module. The instruction, when executed by a processor (e.g., the processor 120) may perform a function corresponding to the instruction. Such a computer-readable medium may be, for example, the memory 130.

The computer-readable recording medium may include a hard disk, a magnetic media such as a floppy disk and a magnetic tape, an optical media such as compact disc-ROM (CD-ROM) and a DVD, a magneto-optical media such as a floptical disk, and hardware devices specifically configured to store and perform a program instruction (e.g., a programming module) such as a ROM, a RAM, and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to various embodiments of the present disclosure may include at least one of the above elements, a part of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added thereto.

According to various embodiments of the present disclosure, it may allowable to greatly reduce an amount of unnecessarily repeated data calculation by storing volatile image information, which is wasted after acquisition during an image-pipelined processing process, and by utilizing the stored information for the corresponding image processing therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory configured to store image data;
a processor, functionally connected with the memory and including at least one image processing module configured to process an image, the processor configured to:
obtain image data from the processing of the image, and
store volatile information that is temporarily obtained from the image during the image processing; and
an image pipeline formed of a plurality of image processing modules configured to perform the image processing in stages,
wherein the processor is further configured to:
obtain the image data, which is processed for the image in stages, from the image pipeline,
store the volatile information, which is obtained from at least one of the plurality of image processing modules, in the memory, and
store the volatile information in a header of a storage format of the image data based on a hierarchical structure grouping similar information in different scale ratios by layers.

2. The electronic device of claim 1, further comprising a second processor configured to process the volatile information,
wherein the second processor is configured to store the processed volatile information in the memory.

3. The electronic device of claim 1, wherein the processor is further configured to process the volatile information in storage units differentiated by types of the volatile information.

4. The electronic device of claim 1, wherein the processor is further configured to allow the volatile information to have different layers by types of the volatile information.

5. The electronic device of claim 4, wherein the processor is further configured to encode a total number of layers of the hierarchical structure and the scale ratios by the layers in security keys and to store the encoded security keys in a security field of the header.

6. The electronic device of claim 1, wherein the processor is further configured to determine layers, which accord to types of the volatile information, based on at least one of a reference unit for storage, complexity of the image, or similarity with adjacent information.

7. The electronic device of claim 1, wherein the processor is further configured to use volatile information, which is obtained from at least a first image processing module of the plurality of image processing modules, for an image processing operation of a second image processing module placed at the next stage of the first image processing module in the image pipeline.

8. The electronic device of claim 1, wherein the processor is further configured to use the volatile information in post-processing the image data.

9. The electronic device of claim 1, wherein the processor further comprises an image codec,
wherein the image codec is configured to use the volatile information for an image processing operation with the image data.

10. The electronic device of claim 1, wherein the processor is further configured to use the volatile information in utilizing the image data through an application.

11. The electronic device of claim 1, wherein the volatile information is at least one of a black level, a color temperature, an average brightness, positional brightness information, positional high-frequency information, color distortion information, positional noise information, edge information, and temporal information of the image.

12. The electronic device of claim 1, further comprising a communication interface,
wherein the processor is further configured to share the volatile information of the image with other electronic device through the communication interface.

13. An image processing method comprising:
obtaining image data from an image processing module processing an input image;
storing volatile information of the image in a header of a storage format of the image data based on a hierarchical structure grouping similar information in different scale ratios by layers; and
performing the image processing in stages,
wherein the volatile information is temporarily obtained from the image during the image processing of the image processing module.

14. The image processing method of claim 13, wherein the obtaining of the image data comprises:
    obtaining the image data that is processed in stages through an image pipeline formed of a plurality of image processing modules processing the image in stages,
    wherein the volatile information is temporarily obtained during the image processing by a corresponding one of the plurality of image processing modules in the image pipeline.

15. The image processing method of claim 14, wherein the obtaining of the image data comprises:
    in processing the input image in stages along the image pipeline by the plurality of image processing module, using volatile information, which is obtained from at least a first image processing module of the plurality of image processing modules, for an image processing operation of a second image processing module placed at the next stage of the first image processing module in the image pipeline; and
    obtaining the image data from the image pipeline.

16. The image processing method of claim 13, wherein the storing of the volatile information comprises:
    processing the volatile information and storing the processed volatile information; or
    storing the volatile information based on a hierarchical structure grouping similar information in different scale ratios by layers.

17. The image processing method of claim 16, wherein a total number of layers of the hierarchical structure, and the scale ratios by the layers, are encoded into security keys to be stored in a security field of the header,
    wherein layers, which accord to types of the volatile information, are determined based on at least one of a reference unit for storage, complexity of the image, or similarity with adjacent information.

18. The image processing method of claim 13, further comprising:
    utilizing the volatile information in at least one of post-processing the image data, processing the image data through an image codec, or processing the image data through an application,
    wherein the volatile information is at least one of a black level, a color temperature, an average brightness, positional brightness information, positional high-frequency information, color distortion information, positional noise information, edge information, and temporal information of the image.

* * * * *